Figure 1:
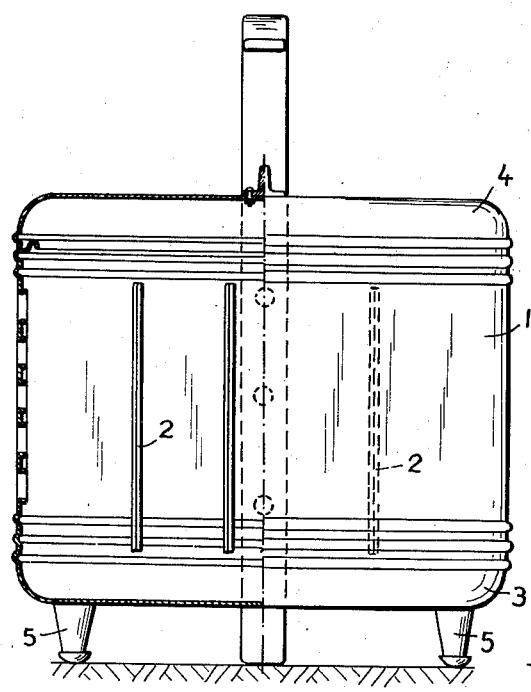

Aug. 4, 1959     B. VON GRUMBKOW     2,898,172
CLEANING APPLIANCE STORAGE DEVICE

Filed May 4, 1955

United States Patent Office
2,898,172
Patented Aug. 4, 1959

2,898,172

CLEANING APPLIANCE STORAGE DEVICE

Botho von Grumbkow, Koln-Thielenbruch, Germany

Application May 4, 1955, Serial No. 505,979

Claims priority, application Germany May 4, 1954

1 Claim. (Cl. 312—206)

The invention relates to cleaning appliances and more particularly to methods of and means for storing the same.

The custom has hitherto been that cleaning appliances such as brooms, scrubbers, mops, small-type vacuum cleaners and the like, which are adapted to be operated or manipulated by means of a wooden handle or the like, are kept in alcoves, on walls, in so-called broom cupboards or in rooms provided for the purpose, such appliances being hung on hooks or the like. In modern houses, which are generally so restricted as to free space that is difficult to find a special handy place for keeping these appliances, they are stored openly or in concealed fashion in places which could be better used for other purposes. Above all, the cleaning appliances are kept under cover where possible, since they have an unattractive appearance.

The invention has as its main object to develop further and improve cleaning appliances of the aforesaid type in conjunction with an associated storage device. Instead of the hitherto conventional appliances with their storage problems, the problem of a simplified techincal solution both for the appliances themselves and also for the method of storing them is solved by the present invention in a progressive fashion in that various appliances or parts thereof can be arranged in or on a portable container in compartments or racks, and a handle element common to the said appliances is releasably fixed to the container. The container may be subdivided for example by vertical partition members into compartments which are accessible either from above or from the side, by means of a common flap or cover or an independent closure for each compartment. The cleaning appliances in the form of brooms, scrubbers or the like are so adapted to one another that a single handle suffices for all of them, the cleaning elements proper being interchangeably fixed to said handle.

According to another feature of the invention, the storage container may take various constructional forms. Preferably the portable compartmented container is provided at the side with a component which at its lower part, forms a foot for the container, and a support for the appliance handle, and which at its upper part forms a carrying handle, while providing between its ends a securing device for the appliance handle and a holding device for a shovel or the like. This component is advantageously S-shaped, and may be formed for example of a tube or a profiled piece of rectangular cross-section. The component has a lower bent-over portion which projects outwardly, and an upper bent-over portion which projects over the container thereby to form the carrying handle. When the container is mounted on feet, the lower projecting portion of the component forms another foot for the container.

The fastening device for the appliance handle is expediently in the form of a clip which may be a double-acting spring made of metal. In addition the holding device for a shovel, the latter to be inserted between the component and the appliance handle, can also be provided in the form of a clip. To this end, a U-shaped element may be provided, which carries resilient elements adapted to grip the shovel. The handle itself serves as an additional clamping means for the shovel.

The construction according to the invention enables the storage container to be located together with the cleaning appliances at any free place in the house. The parts required for cleaning are combined in one portable container. The portable container can easily be shifted from place to place. Moreover room is saved, since only one handle is required for a plurality of cleaning elements. The container can be constructed in a modern attractive shape, so that the whole apparatus can be an attractive addition aesthetically for any room. The subject of the invention also helps to save journeys and therefore time. Whereas hitherto it was only very rarely that the housewife planned, or was in a position, to take along to the particular place of work all the articles necessary for cleaning and dusting the rooms, it is now obviously possible, thanks to the present invention, to carry the requisite parts in one self-contained unit to the particular place which is to be cleaned, since the labour-saving device according to the invention includes, in portable and advantageous manner, the appliances for washing (scrubber), dry-cleaning (brooms, shovels), care of floors (mop) and care of textile material (brush).

The storage device according to the invention can be adapted to receive cleaning appliances of the most varied kinds. Thus, the storage device can also carry a vacuum cleaner, so that the latter can be used at every possible opportunity. A suitably constructed vacuum cleaner will expediently be arranged centrally of the portable container, the associated rigid and flexible pipes being clamped fast to the container wall similarly to the handle. The manner of arrangement may vary. For example, the cylinder-type vacuum cleaner with motor and dust bag can be fitted directly in the container. Alternatively, this unit can be provided externally of the container and mounted on the extended bottom part of the S-shaped component.

Further features of the invention will become apparent from the accompanying drawings and the following description.

Figure 3:
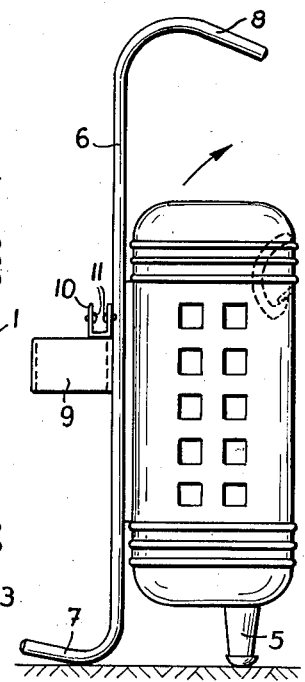
Figure 2:
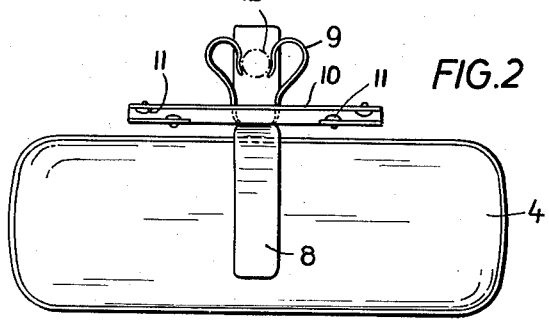

Figures 1, 2 and 3 are an elevational, plan and side view of one constructional example of a storage container according to the invention.

The storage device according to the invention consists of a container 1, which is sub-divided by partitions into a number of compartments. The container has a closed bottom portion 3 and a hinged cover 4 which is adapted to be lifted at the carrying side and opens sufficiently far to enable the contents to be removed easily. A spring clip for holding dusters or the like can be arranged on the inner side of the cover. The bottom and the cover are preferably identical pressed parts.

The container can be mounted on feet 5. Disposed at the side of the container is a component 6, for example, of rectangular cross-section, which at the bottom forms a foot 7 adapted at the same time to serve as a support for the appliance handle which is to be clipped on. At its upper region the component 6 terminates in a carrying handle 8. The bent-over handle 8 can serve at the same time as an abutment for the rear edge of a shovel. At the same time the component 6 forms the basis for securing the shovel and the clamping device for the appliance handle 12. This clamping device is expediently formed of a double-acting spring 9 of strip metal or the like. The appliance handle is held clamped between the bent spring ends. The holding device for the shovel arranged between appliance handle and component 6 may consist of a U-shaped rail 10 provided with bulbous elastic shaped parts 11 for gripping the scoop edge of the shovel. Two feet 5, for example, are sufficient for the container, whilst the third foot is formed by the bottom bent-over portion 7 of the component 6. The feet are advantageously made of resilient material e.g. plastic, and thus at the same time have a resilient and shock-absorbing effect.

As will be noted from the above description and the accompanying drawing, the invention provides a portable container for a cleaning appliance having cleaning tools and a cleaning tool extension. The container comprises a casing compartmented by partitions 2, the casing having an open top and providing for the storage of the cleaning fluids. The casing for this purpose includes sides and a bottom defining a chamber for these tools.

The feet 5 are connected to the casing at the bottom of the latter along one of the aforesaid sides. These feet extend externally of the casing. The cover 4 is pivoted to one side of the casing at the open top of the latter, and carrying member 6 is connected to the opposite side of the casing and constitutes a substantially vertical member located substantially centrally of the casing.

The lowermost portion 7 of the carrying member extends away from the casing at the level of the feet 5, to constitute with these feet a stand for the casing. The uppermost portion 8 of the carrying member 6 extends above the casing to constitute a carrying handle therefor. With the clamp 9 accommodating the appliance handle, the lowermost portion 7 of the carrying member 6 constitutes a brace for the appliance handle or extension.

In summary, there is provided a container for cleaning appliances which is portable in the sense that it can be lifted from the floor and bodily removed to another position without necessarily coming into contact with the floor. The arrangement of the parts so relates the center of gravity of the structure to the uppermost portion 8 as to facilitate manipulation of the structure.

What is claimed is:

A portable container for a cleaning appliance having cleaning tools and a cleaning tool extension comprising a compartmented casing having an open top and providing for the storage of the cleaning tools, said casing including sides and a bottom defining a chamber for said tools, feet fixed on said bottom along one of said sides and externally of said casing, a cover pivoted to said one side at said open top, a carrying member connected to the casing on a side of the latter opposite to said one side, said carrying member being a substantially vertical member located substantially centrally of the opposite side, said carrying member having a lowermost portion extending away from the casing at the level of the feet to constitute with the latter a stand for the casing, said carrying member further including an uppermost portion extending above the casing to constitute a carrying handle therefor, and a clamp on the carrying member for accommodating said extension, said lowermost portion constituting a brace for the extension.

References Cited in the file of this patent

UNITED STATES PATENTS

| | | |
|---|---|---|
| D. 158,549 | Bassin | May 16, 1950 |
| D. 161,105 | Haworth | Dec. 5, 1950 |
| 1,846,976 | Nelson | Feb. 23, 1932 |
| 2,051,728 | Manning | Aug. 18, 1936 |
| 2,232,548 | McAnerney | Feb. 18, 1941 |
| 2,425,107 | Martin | Aug. 5, 1947 |
| 2,491,680 | Meyerhofer | Dec. 20, 1949 |
| 2,534,122 | Hamala | Dec. 12, 1950 |
| 2,603,816 | McFarland | July 22, 1952 |
| 2,634,189 | Hill | Apr. 7, 1953 |
| 2,636,207 | Reece | Apr. 28, 1953 |
| 2,716,253 | Schwarz | Aug. 30, 1955 |